United States Patent [19]

Baumann et al.

[11] Patent Number: 4,911,962
[45] Date of Patent: Mar. 27, 1990

[54] INSULATING SYSTEM FOR THERMALLY-INSULATED CONTAINERS

[75] Inventors: Hansjörg Baumann, Muhlau; Manfred Schill, Affoltern, both of Switzerland

[73] Assignee: Lonza Ltd., Gampel/Valais, Switzerland

[21] Appl. No.: 265,771

[22] Filed: Nov. 1, 1988

[30] Foreign Application Priority Data

Nov. 4, 1987 [CH] Switzerland .................. 4306/87

[51] Int. Cl.⁴ .................. B32B 3/26; B65D 81/02
[52] U.S. Cl. .................. 428/36.5; 206/523; 428/35.7; 428/71; 428/76; 428/212; 428/213; 428/218; 428/314.4; 428/314.8; 428/316.6; 428/317.1; 428/317.7
[58] Field of Search .................. 428/36.5, 35.7, 316.6, 428/314.4, 314.8, 317.1, 317.7, 212, 213, 218, 71, 76; 206/523

[56] References Cited

U.S. PATENT DOCUMENTS

| 2,724,670 | 1/1954 | Mason | 428/213 |
|---|---|---|---|
| 3,138,248 | 5/1963 | Abbott | 206/52.2 |
| 3,220,902 | 11/1965 | Edwards | 428/316.6 |
| 3,489,311 | 5/1967 | Folkerts et al. | 220/444 |
| 3,895,087 | 7/1975 | Ottinger et al. | 264/46.2 |
| 4,147,828 | 4/1979 | Heckel et al. | 428/316.6 |
| 4,476,183 | 10/1984 | Holtrop et al. | 428/316.6 |
| 4,497,859 | 2/1985 | Baumann | 428/71 |
| 4,642,253 | 2/1987 | Rüoff-Schäfer | 428/36.5 |
| 4,851,286 | 7/1989 | Maurice | 428/316.6 |

FOREIGN PATENT DOCUMENTS

| 705856 | 3/1965 | Canada | 425/316.6 |
|---|---|---|---|
| 986353 | 5/1965 | United Kingdom | 428/316.6 |

Primary Examiner—Thurman K. Page
Assistant Examiner—Archene A. Turner
Attorney, Agent, or Firm—Fisher, Christen & Sabol

[57] ABSTRACT

Insulating system for thermally insulated containers, composed of a shock-absorbing layer, made of soft elastic closed-cell foam, glued to an inside surface of the container, and an insulating layer made of hard foam applied in a floating manner to this layer.

4 Claims, 1 Drawing Sheet

INSULATING SYSTEM FOR THERMALLY-INSULATED CONTAINERS

BACKGROUND OF THE INVENTION

1. Field Of The Invention

The invention relates to insulating systems for thermally-insulated containers.

2. Background Of The Invention

It is known to design thermally-insulated containers so that the insulating material, mostly foamed polyurethane, is applied between the inside surfaces of the outside wall and inside wall. It is also known to design the container walls with the help of homogeneously foamed material of the same material and thickness as sandwich plates. The drawback of these designs is that they are very prone to damage, i.e., after short use the insulating layer, which is generally hard and brittle, breaks or decomposes and, thus, the insulating effect deteriorates.

In the case of a sandwich plate, the mechanical stability is also adversely affected.

BROAD DESCRIPTION OF THE INVENTION

The object of the invention is to eliminate the above-described drawbacks. This is achieved according to the invention by the invention insulating system for thermally insulated containers. On the inside surface of the outside wall of the container is applied a shock-absorbing and impact-absorbing layer of a soft elastic, closed-cell soft foam with a bulk density of 25 to 50 kg/m$^3$ in a thickness of 15 to 30 mm by gluing or surface pressure, on which is applied in a floating manner an insulating layer of hard foam which a bulk density 40 to 90 kg/m$^3$ in a thickness of 20 to 80 mm, which on one side has a reinforcement layer toward the inside.

DETAILED DESCRIPTION OF THE INVENTION

The shock-absorbing and impact-absorbing layer, made from soft elastic, closed-cell soft foam, preferably has a bulk density of 30 to 35 kg/m$^3$. The plastic material can be, for example, polyurethane, PVC or preferably polyethylene. This material suitably has a low specific thermal conductivity of, for example, from 0.03 to 0.04 W/mk and, therefore, is also at the same time a component of the container insulation. This shock-absorbing and impact-absorbing layer is used in a wall thickness of 15 to 30 mm, preferably 20 to 25 mm. This layer can be fastened by gluing, for example, with the help of a contact adhesive, of a self-adhesive strip or by surface pressure, to the inside surface of the outside wall of the container, and the latter can be plane or curved.

The insulating layer of hard foam exhibits a bulk density of 30 to 90 kg/m$^3$, preferably 40 to 50 kg/m$^3$. It is used in a thickness of 20 to 80 mm, suitably 30 to 50 mm. The plastic material of this layer can be, for example, polyurethane or PVC; preferably hard PVC foam is used, which exhibits a specific thermal conductivity of 0.02 to 0.04 W/mk.

This insulating layer is provided on the container inside with a reinforcement layer. This reinforcement layer can be a metal, for example, surface-treated or stainless steel, aluminum or other metal alloys, or a solid plastic in the form of profiles, plates and sheets or lightweight foamed, extruded plates.

The coated insulating layer is applied in a floating manner to the shock-absorbing and impact-absorbing layer, i.e., it is not solidly connected to the shock-absorbing and impact-absorbing layer at any point.

The insulating system of the present invention mechanically is not adversely affected when used as in the shipping of the containers or in the handling of the containers by loading devices (forklifts), conveying devices, roller conveyors, lifting or transporting devices. Also torsional forces do not adversely affect the mechanical and insulating properties.

BRIEF DESCRIPTION OF THE INVENTION

DETAILED DESCRIPTION OF THE DRAWING

Figure 1:
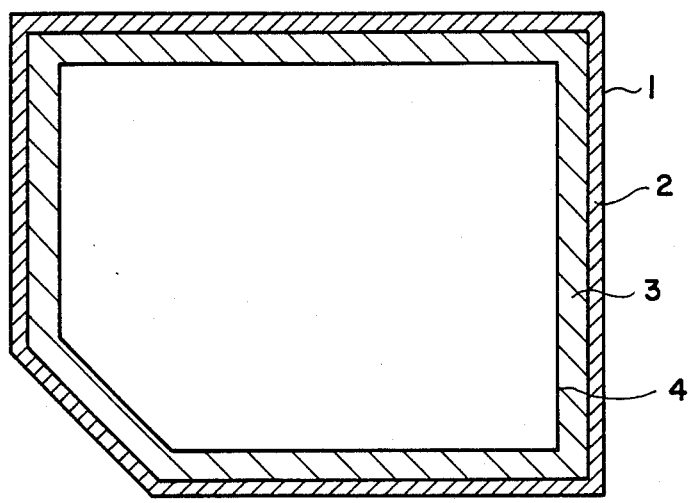
FIG. 1 is a cross-sectional view of the insulating system of the invention.
Figures 2A, 2B:
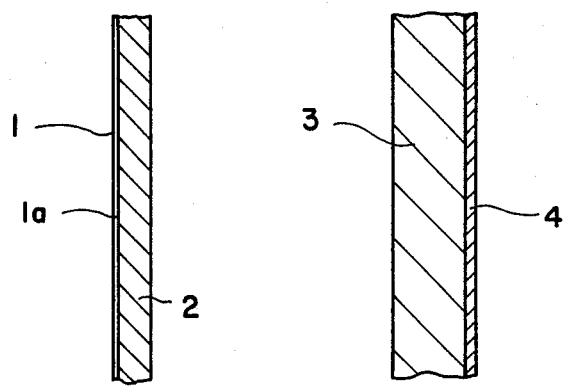
FIG. 2(a) is a partial cross-sectional view of the outside wall and the impact-absorbing layer.
FIG. 2(b) is a partial cross-sectional view of the insulating layer and the reinforcement layer.

The invention insulating system for a thermally insulated container is represented in FIGS. 1 and 2. Impact-absorbing layer 2 is applied to outside wall 1 by glue layer 1a. Outside wall 1 can be any conventional or suitable material. Insulating layer 3 is provided on its inside wall with a reinforcement layer 4.

What is claimed is:

1. Insulating system for thermally insulated containers, characterized in that on the inside surface of the outside wall of the container there is a shock-absorbing and impact-absorbing layer of a soft, elastic, closed-cell soft foam with a bulk density of 25 to 50 kg/m$^3$ in thickness of 15 to 30 mm, which was applied thereto by gluing or surface pressure, on the inside surface of which there is, in a floating manner, an insulating layer of hard foam with a bulk density 40 to 90 kg/m$^3$ in a thickness of 20 to 80 mm, on the inside surface of which there is a reinforcement layer, the storage space of the container being inside of and completely surrounding by the reinforcement layer.

2. The insulating system as claimed in claim 1 wherein the soft elastic, closed-cell soft foam is polyurethane, polyvinylchloride or polyethylene.

3. The insulating system as claimed in claim 1 wherein the insulating layer of hard foam is polyurethane or polyvinylchloride.

4. The insulating system as claimed in claim 1 wherein the reinforcement layer is metal or a solid plastic.

* * * * *